United States Patent [19]
Kruger et al.

[11] Patent Number: 6,072,573
[45] Date of Patent: *Jun. 6, 2000

[54] PORTABLE LASER POWER MEASURING APPARATUS

[75] Inventors: Christopher J. Kruger, Auburn; Gerald H. Williams, Applegate; Robert R. Naquin, Loomis; Charles W. Dennett, Woodland, all of Calif.

[73] Assignee: Coherent, Inc., Santa Clara, Calif.

[ * ] Notice: This patent is subject to a terminal disclaimer.

[21] Appl. No.: 09/115,931

[22] Filed: Jul. 15, 1998

Related U.S. Application Data

[63] Continuation of application No. 08/908,472, Aug. 6, 1997, Pat. No. 5,805,277.

[51] Int. Cl.$^7$ ............................................... G01J 1/42
[52] U.S. Cl. .................... 356/213; 356/218; 356/224; 250/214 SW
[58] Field of Search .................................. 356/213, 215, 356/218, 216, 224, 227, 229; 307/311; 250/214 R, 214 SW; 327/303, 514, 361

[56] References Cited

U.S. PATENT DOCUMENTS

| | | |
|---|---|---|
| 3,687,558 | 8/1972 | Rex ........................................ 356/218 |
| 3,732,491 | 5/1973 | Battista ................................... 356/215 |
| 3,782,834 | 1/1974 | Fujimori et al. ........................ 356/429 |
| 3,966,325 | 6/1976 | Mohler .................................... 356/218 |
| 4,015,116 | 3/1977 | Bahm ...................................... 356/215 |
| 4,027,973 | 6/1977 | Kaye ......................................... 356/73 |
| 4,320,289 | 3/1982 | White et al. ........................ 250/214 R |
| 4,643,568 | 2/1987 | Forsberg ................................. 356/218 |
| 4,749,275 | 6/1988 | Shimomura et al. ................... 356/222 |
| 5,008,743 | 4/1991 | Katzir et al. ............................ 358/101 |
| 5,138,178 | 8/1992 | Wong et al. ............................ 356/429 |
| 5,148,233 | 9/1992 | Imamura et al. ....................... 356/235 |
| 5,409,314 | 4/1995 | Laakmann ................................ 374/32 |
| 5,897,611 | 4/1999 | Case et al. .............................. 356/400 |

*Primary Examiner*—Hoa Q. Pham
*Attorney, Agent, or Firm*—Limbach & Limbach L.L.P.

[57] ABSTRACT

Apparatus for measuring power in a laser-beam includes a transmissive diffuser for diffusely expanding the laser-beam and a photon detector for receiving the diffusely-expanded laser-beam and generating an electrical signal in response thereto. Electronic circuitry including a microprocessor is provided for interpreting the electrical signal as a measure of power in the laser-beam. A display device is provided for displaying the interpreted signal.

27 Claims, 3 Drawing Sheets

PORTABLE LASER POWER MEASURING APPARATUS

This is a continuation of application Ser. No. 08/908,472, filed Aug. 6, 1997 now U.S. Pat. No. 5,805,277.

TECHNICAL FIELD OF THE INVENTION

The present invention relates generally to laser power measurement apparatus. It relates in particular to compact, portable laser-beam power measurement apparatus incorporating a photon detector and a diffusing device for diffusely expanding an incident laser-beam and uniformly illuminating the photon detector with the diffusely-expanded laser-beam.

DISCUSSION OF BACKGROUND ART

Prior art measuring apparatus for measuring power in laser-beams having relatively high power, for example, about one Watt (1.0 W) has relied on use of a thermopile detector arrangement for converting energy from a laser-beam to be measured into heat, and estimating power from a rate of rise of temperature of the thermopile detector. Such a detector may include a receiving medium which absorbs light from the laser-beam and rises in temperature, a thermocouple array in thermal contact with the receiving medium for generating a voltage signal from the heating of the receiving medium, and suitable electronic arrangements for interpreting temperature rise of the receiving medium as a measure of laser power incident thereon.

Such measuring apparatus, in compact form, is prone to providing inaccurate or non-reproducible results for several reasons. By way of example, results may depend on the location of the measured laser-beam on the receiving medium, interpretation of which results is complicated in turn because temperature rise rate is typically non-linear. This is further complicated, as far as repeatability of measurements is concerned, by "memory" effects resulting from heating of the receiving medium in prior measurements. Where size and portability of such apparatus is not important, most of these problems can be overcome by heat dissipation arrangements including active cooling arrangements such as fans or the like. Arrangements such as this are still standard for laboratory measurements of laser power.

Size notwithstanding, however, thermopile devices are not readily adaptable to measuring laser-beams having a wide power range, for example six or more orders of magnitude. In order to effectively measure low powers the receiving medium must have a low thermal capacity, and consequently be mechanically somewhat fragile, in order to undergo a measurable temperature rise when irradiated by a low-power laser-beam. Such a fragile receiving medium is not acceptable for measuring a high-power beam. Attempts to attenuate a high power beam by a known factor before measurement only add to above-discussed inherent measurement inaccuracies.

Photon detectors, here, meaning devices which generate an electrical signal in response to light incident thereon, for example by direct generation of a voltage, as in a photovoltaic cell, or via a change in electrical resistance in response to light incident thereon, as in a photodiode, are inherently more accurate devices for laser power measurement. However, such devices have not been generally accepted as a means of measuring laser power over a relatively wide range. This is due in no small measure to that fact that such devices, photodiodes in particular, are easily saturated, and may be damaged, by even relatively modest levels of laser power. In this regard, such devices may be particularly vulnerable to laser-beams having a non-uniform cross-section intensity and which may include, in the cross-section, localized regions of high intensity, usually termed "hot spots" by practitioners of the laser art. This can lead to local damage as well as generally inaccurate measurements. The use of typical attenuating devices, such as thin-film, neutral-density filters, or absorbing glass attenuators, for reducing overall power in a laser-beam, by a known factor, prior to measurement, is at best partially helpful in this regard, as it does not deal with measurement inaccuracies resulting from the "hot spots", and the attenuators themselves are prone to damage by high-power beams. Photon detectors also have a response which is dependent on the wavelength of light being measured.

There is a need for a laser power measurement apparatus which can take advantage of the inherent accuracy of a photon detector device. The apparatus is preferably capable of measuring laser power over a relatively wide range of laser power and at a number of different laser wavelengths, and is preferably capable of being configured in an easily portable package.

SUMMARY OF THE INVENTION

In one aspect, laser-beam power measurement apparatus in accordance with the present invention comprises a photon detector, such as a photodiode, a photocell, or a photovoltaic cell, which is arranged to provide an electronic signal when laser light is incident thereon. A transmissive diffusing arrangement is provided for receiving and diffusely expanding a laser-beam to be measured. The diffusing arrangement is aligned with respect to the photon detector such that the diffusely-expanded laser-beam is incident thereon. Electronic circuitry, including a microprocessor, is provided for receiving a signal produced by the photon detector when the diffusely-expanded laser-beam is incident thereon, and for interpreting the received signal as a measure of power in the laser-beam. The interpreted signal may be presented on a display such as a liquid-crystal display (LCD) or the like.

In one preferred example, the diffusing apparatus includes two transmissive diffusing plates spaced apart in a face-to-face manner. The laser-beam is incident on a first of the diffusing plates, is once expanded by that diffusing plate, and the once-expanded laser-beam is further expanded by the second diffusing plate to form the diffusely-expanded beam which is incident on the photon detector. Expanding the laser-beam to be measured reduces the intensity, i.e., power per unit area, in the laser-beam to be measured. In a two plate diffusing arrangement using two 1.5 millimeter (mm) thick alumina diffusing-plates, beam area can be expanded form about 1.0 mm to 10.0 mm, reducing by intensity by a factor of 100. This allows a laser beam having a power of about 1 W, to be measured, without damaging the photon detector.

Making diffusing plates from a refractory (oxide) material such as alumina which is transparent to light in the laser-beam to be measured provides that the beam-intensity attenuating action of the diffusing arrangement generates essentially no heat. This would not be the case were an equal level of attenuation of the beam effected using an absorbing attenuator such as a neutral density coating or a grey-glass plate. Further, the diffusive beam-expansion action of the diffusing arrangement, tends to homogenize power distribution across a beam, thereby eliminating non-uniformity, in particular, hot-spots, in a beam to be measured.

In a preferred embodiment of laser power measuring apparatus in accordance with the present invention, the diffusing arrangement may be selectively retracted from the above-described alignment with the photon detector to an extent that, when in this retracted position, it no longer receives the laser-beam to be measured. This allows the laser-beam to be measured to be incident directly on the photon detector, which provides a corresponding signal.

Retracting the diffusing arrangement (or replacing it, if it is already retracted) operates a switch which is connected to the electronic circuitry and indicates to the circuitry whether or not the diffusing arrangement is retracted. The electronic circuitry interprets signals received from the photon detector in a manner depending on whether or not the diffusing arrangement is retracted.

This selective retractibility of the diffusing arrangement provides that beams in both high and low power ranges can be measured. The latter, of course, when the diffusing arrangement is retracted. In one embodiment of apparatus in accordance with the present invention described in detail hereinbelow, low and high power ranges lie in a total range from 1.0 microwatts ($\mu$W), to 1.0 W or one-thousand milliwatts (mW). The low range (without the diffusing arrangement) extends from 1.0 $\mu$W to 10.0 mW. The high range (using the diffusing arrangement) extends from 10.0 mW to 1000.0 mW.

In another aspect of laser power measurement apparatus in accordance with the present invention, the apparatus is configured to measure power on a "sample-and-hold" basis. The photon-detector provides a signal representative of laser-beam power essentially instantaneously when a directly impinging or diffusely-expanded laser-beam is incident thereon. The electronic circuitry of the apparatus is instructed to interpret the signal by means of a button or switch activated by an operator of the apparatus. Activating the switch marks the end of a sample period. The interpretation, in turn, occurs essentially instantaneously, and the interpreted signal is displayed as the highest measured power during the sample period. The circuitry can be programmed to hold (and display) the interpreted signal either for a predetermined time period, or until another instruction to interpret is received, whichever comes first.

This method of operation offers a considerable advantage in that a measurement may be made, without significant sacrifice of accuracy, before any significant heating of the photon detector due to absorption of laser-light thereby occurs. In thermopile apparatus, accuracy is proportional to a significant extent on the time over which the thermopile temperature is allowed to rise, and the level to which it rises. Further, by "holding" a measurement for only a relatively short time, for example about 15 seconds, power consumption per measurement can be held sufficiently low that apparatus in accordance with the present invention, powered by a lithium battery, is capable of making greater than about 120,000 measurements before battery replacement is required.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1:
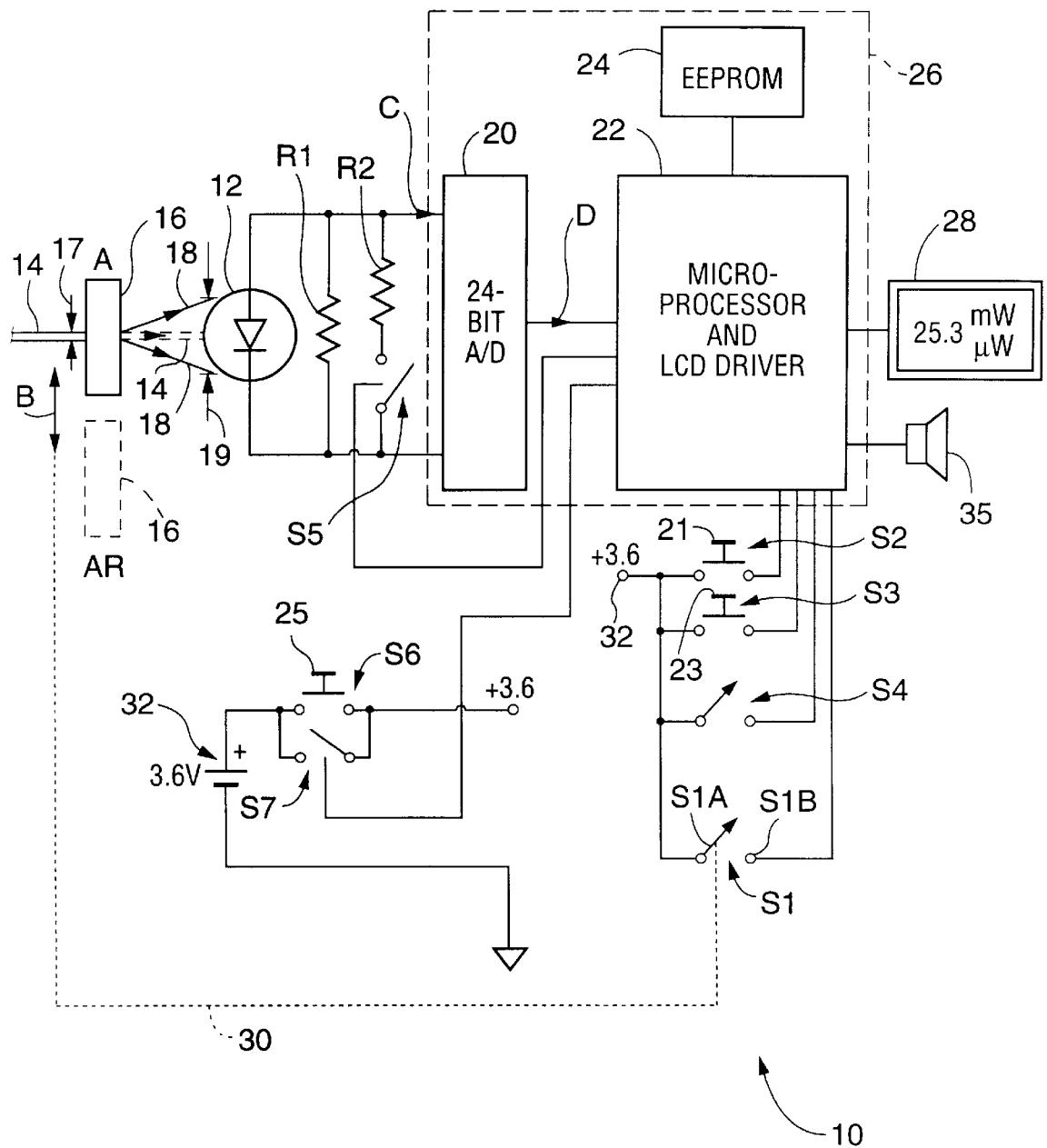
FIG. 1 is a block diagram schematically illustrating one preferred embodiment of laser-beam power measuring apparatus in accordance with the present invention incorporating a transmissive diffuser for diffusely expanding a laser-beam to be measured.
Figure 2:
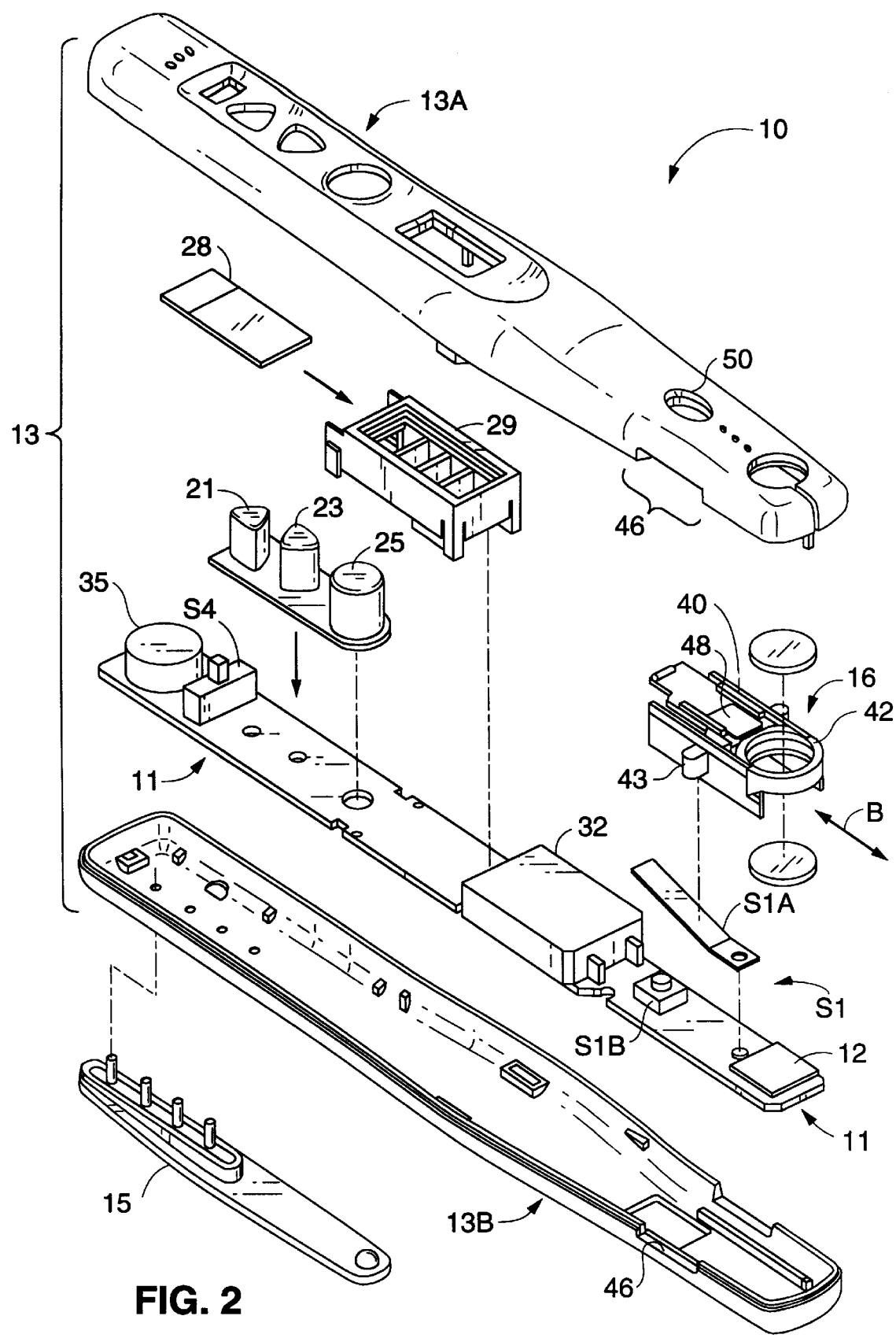
FIG. 2 is an exploded perspective view schematically illustrating assembly details of a pocket-sized, pen-like embodiment of laser power measurement apparatus including a diffuser assembly and corresponding to the block diagram of FIG. 1.

Turning now to the drawings, wherein like components are designated by like reference numerals, FIGS. 1 and 2 schematically illustrate one preferred embodiment 10 of laser power measuring apparatus in accordance with the present invention. FIG. 1 illustrates apparatus 10 in block diagram form, showing details of electronic components and interconnection thereof. FIG. 2 is an exploded perspective view of a compact pen-like embodiment of apparatus 10 and shows the layout and relative size of certain functional components of the apparatus. Mechanical assembly components, wiring and certain electronic components have been omitted for clarity. In FIG. 2 electronic components, switches and the like are illustrated as being assembled on a printed circuit board 11. The printed circuit board and components thereon are contained in a pen-shaped or wand-shaped case or shell 13 comprising upper and lower portions 13A and 13B respectively. A clip 15 is attached to case 13 for convenience in carrying apparatus 10 in a user's pocket.

Continuing with reference to FIG. 1, apparatus 10 includes a photon detector, here, exemplified by a photocell 12, preferably a silicon photodiode. A suitable photodiode is a photodiode chip available from Vision Manufacturing Inc. of Angora Hills, Calif. An input laser-beam 14 to be measured is caused to be incident at about normal incidence on a transmissive diffuser 16 when the diffuser is in position A aligned with photocell 10 (see FIG. 1). Diffuser 16 is illustrated in FIG. 2 in the form of an "exploded" assembly. A further, more detailed discussion of diffuser 16 is presented hereinbelow following this general description of apparatus 10.

In position A, diffuser 16 diffusively expands input laser-beam 14 as indicated by arrows 18, and causes the diffusively-expanded laser-beam 18 to be incident on photocell 12. The intensity of diffusively-expanded laser-beam 18 compared with the intensity of input laser-beam 14 is reduced by the square of the ratio of the respective beam diameters 19 and 17. Diffuser 16 thus functions as an intensity attenuator for input laser-beam 14. In a preferred example, diffuser 10 reduces beam intensity by a factor of one-hundred.

Diffuser 16 can be retracted or moved out of the path of laser-beam 14 (an moved back in again) as indicated by arrows B. When diffuser 18 is in retracted position AR, input laser-beam 14 passes-by the diffuser and is incident directly, unexpanded, on photocell 12.

In response to the incident, diffusively-expanded laser-beam 18 (input laser-beam 14) an analog voltage signal (represented by arrow C), proportional in magnitude to the intensity of input laser-beam 14, is generated across one or both of resistors R1 and R2 (not shown in FIG. 2). This signal is received by, and digitized by (as indicated by arrow D), a 24 bit analog-to-digital (A/D) converter 20 and passed to a microprocessor and LCD driver 22. A preferred A/D converter is a type AD7714RS-3 available from Analog Devices Inc. of Campbell, Calif. 22. A preferred microprocessor 22 is a type PIC16C923 available from Microchip Inc. of Encino, Calif.

Connected to microprocessor 22 is a supplementary memory in the form of an EEPROM 24. A/D converter 20, microprocessor and LCD driver 22 and EEPROM 24 form an electronics assembly indicated by broken line 26 in FIG. 1. Electronics assembly 26 is, in effect, a microcomputer that receives signal B and interprets it as a measure of power in input-laser-beam 14. The interpreted signal is displayed on a display device 28, such as an LCD. A preferred display device is a type VI-413-2, available from VL Electronics Inc. of Los Angeles, Calif. Display device 28 is shown mounted on a frame 29 in FIG. 2.

Microprocessor 22 is programmed to perform the signal interpretation in a manner depending on the wavelength of laser-light in input laser-beam 14 and on whether diffuser 16 is in position A, or in retracted position AR. EEPROM 24 stores values of constants and coefficients characteristic of the response of photocell 12 to wavelength and intensity of light incident thereon. Included in these is a table of wavelength correction factors which correspond to the different photon response of the photodiode for different light wavelengths. These values and constants are used by microprocessor 22 to perform the interpretation. The manner in which the position of diffuser 16 and the wavelength to be measured are communicated to microprocessor 22 is as follows.

The position of diffuser (attenuator) 16 is communicated by mechanically coupling the insertion and retraction action (arrow B) for diffuser 16 to a switch S1 including contacts S1A and S1B. Contact S1A, as shown in FIG. 2, is spring loaded, and is pressed into connection (or lifted out of connection) with contact S1B by the sliding action (arrows B) of diffuser 16. This coupling is indicated in FIG. 1 in a simplified form by dotted line 30. Switch S1 is connected between a 3.6 V DC supply (terminal 32) and microprocessor 22. Open and closed positions of switch S1 correspond to inserted A and retracted AR positions of diffuser 16.

Wavelength is communicated, pulse-wise, to microprocessor 22 by press-to-close/release-to-open, switches S2 and S3, activated by buttons 21 and 23 respectively, one thereof for incrementing and the other thereof for decrementing through a plurality of preprogrammed common laser emission wavelengths. In order to input, i.e., change, the wavelength of laser-light to be measured, microprocessor 22 must be put into an input mode. This is done by opening a toggle-type switch S4, which may be described as a mode-switch. When microprocessor 22 is in the input mode, input wavelength is indicated by display 28.

When switch S4 is closed, microprocessor 22 is in a power-measurement mode. When microprocessor 22 is in a power-measurement mode, and activated for measuring power, the magnitude and units of measured power are indicated by display 28. In any position of diffuser 16, range switching is performed automatically by microprocessor 22, which on receiving a predetermined maximum bit-count (signal D) from A/D converter 22 closes a switch S5 (not shown in FIG. 2) shunting resistor R2 across resistor R1. R2 has a resistance three orders of magnitude lower than resistor R1. When signal D drops below a predetermined minimum, switch S5 is opened again.

Apparatus 10 is preferably arranged to be powered only for changing wavelength to be measured, or when a measurement is being made and read. A battery 32 provides power for apparatus 10. One suitable battery is a Lithium 3-6V LTC-7PN available from Eagle Pitcher of Quapaw, Okla. As noted above, measurements are preferably made on a sampling basis, the measurement being displayed only long enough for a user of the apparatus to take note of it or manually record it.

Sampling is initiated by operating a press-to-close/release-to-open, switch S6 activated by a button 25.

Closing switch S6 connects power from battery 32 to microprocessor 22 and display 28 to initiate a measurement operation. Microprocessor 22 then immediately closes a switch S7 (not shown in FIG. 2). This allows microprocessor 22 to continue to receive power from battery 32 when switch S6 is released. Measurement begins essentially instantaneously and continues until switch S6 is released (opened). The highest power measured during the time switch S6 is closed is corrected by a wavelength correction factor, "looked up" by microprocessor 22 from above-mentioned values stored in EEPROM 24, and the corrected power is displayed on display 28. After a preprogrammed time-interval, for example, about 15 seconds, microprocessor 22 opens switch S7, thereby shutting off power to apparatus 10. Another measurement may be initiated, of course, before the preprogrammed time-interval elapses. If Signal C exceeds a preprogrammed limit value, representative of a maximum safe irradiation level for photocell 12, (independent of the position of diffuser 16), microprocessor 22 activates an audible alarm via a miniature loudspeaker 35 and maintains this alarm until photocell 12 has been removed from the incident laser-beam.

Figure 3:
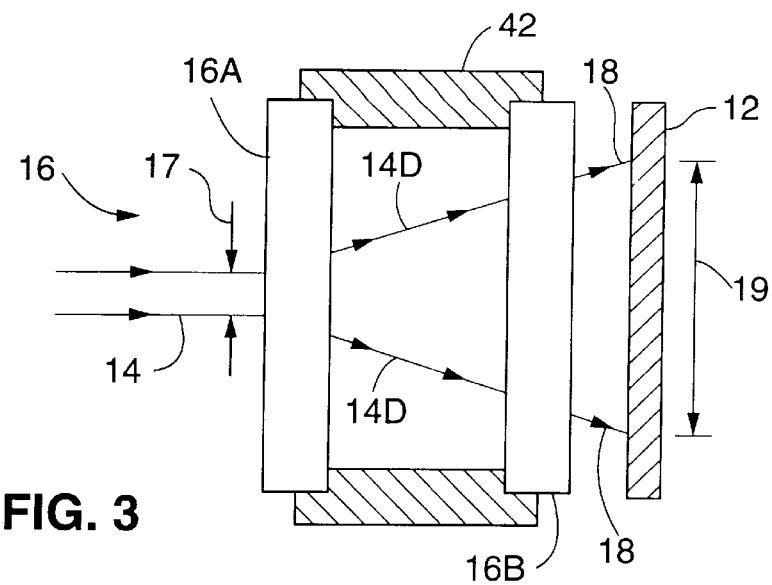
FIG. 3 is a general cross-section view schematically illustrating one arrangement of a transmissive diffuser suitable for use in the apparatus of FIG. 1, and a photocell for receiving a laser-beam expanded by the transmissive diffuser.
Figure 4:
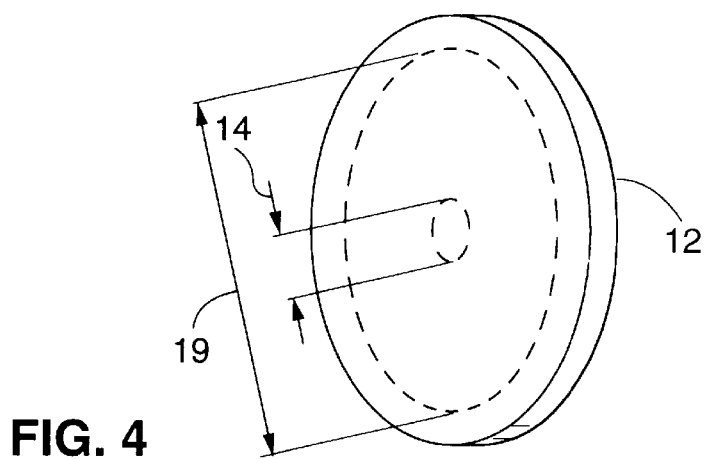
FIG. 4 is perspective view schematically illustrating the cross-section area of the diffusely-expanded beam of FIG. 3 substantially filling the cross-section area of the photocell of FIG. 1.
Figure 5:
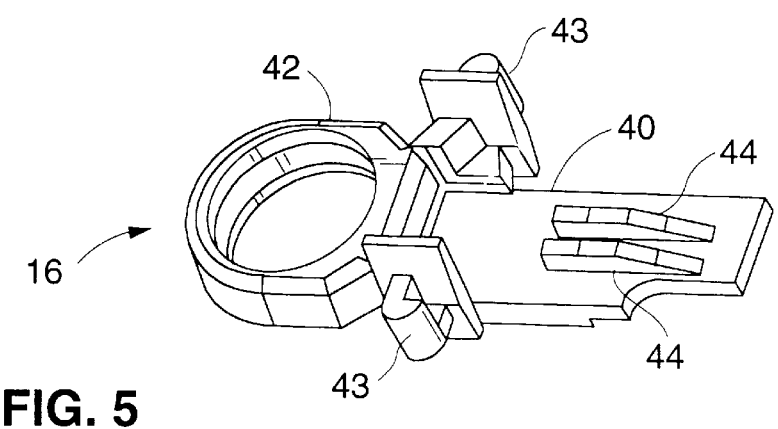
FIG. 5 is a perspective view seen from below schematically illustrating a frame for the diffuser assembly of FIG. 2.

Continuing with reference to FIG. 2, and additionally to FIGS. 3, 4, and 5, further details of diffuser 16 are illustrated. Diffuser 16 is assembled on a frame 40 see FIG. 2) including a spacer-ring 42 (see FIGS. 3 and 4).

Buttons 43, extending laterally from frame 40, extend through slots 46 in an assembled case 13 for sliding the diffuser as indicated by arrows B. Cams 44 (see FIG. 5) operate spring-loaded contact S1A of switch S1 in response to the sliding action. Position of the diffuser is indicated to an operator via a label 48 (see FIG. 2) viewed through an aperture 50 in upper case member 13A.

Two diffusely-transmissive plates (transmissive diffuser plates) 16A and 16B are mounted on and spaced apart by spacer ring 42 (see FIG. 3). Diffuser plates 16A and 16B are preferably formed from a refractory oxide material. In a preferred from, these plates are made from hot-pressed alumina and preferably have a diameter of about 10.0 mm and a thickness of about 1.50 mm. Diffuser plates 16A and 16B are preferably spaced apart by a distance of about 2.0 mm. Diffuser plate 16B is preferably spaced apart from photocell 12 by a distance of about 2.0 mm. Photocell 12 has a measurement-area about 10.0 mm square.

Input laser-beam 14 is incident on diffuser plate 16A. Diffuser plate 16A creates a diverging beam 14A which increases in cross section area as it approaches diffuser plate 16B. On traversing diffuser plate 16B the beam is further expanded by diffusion and then continues to diverge as it approaches solar cell 12. As noted above, the intensity attenuation provide by diffuser 16 is the square of the ratio of the input laser-beam diameter 17 to the diameter 19 of diffusely-expanded beam 18 on photocell 12.

The above exemplified dimensions for diffuser plate thickness, and spacing between plates and photocell 12 will provide an intensity attenuation of about 1/100. An input laser-beam 14 having a diameter of about 1.00 mm would be expanded by diffuser to a cross-section area which substantially fills the measurement-area of photocell 12, giving optimum signal strength.

It should be noted that the configuration of diffuser 16 including two spaced-apart transmissive diffuser plates is merely one example of how a diffuser in accordance with the present invention may be configured, in this case convenient for the compact, portable format depicted in FIG. 2. Those skilled in the art to which the present invention pertains will recognize, without further illustration, that a diffuser in accordance with the present invention may be configured with only one diffuser plate or with more than two diffuser plates depending, for example, on attenuation level desired or space available. Where two or more diffuser plates are provided these are preferably spaced apart in a face-to-face manner and arranged such that laser-beam 14 is incident on an outermost one thereof and is sequentially expanded by the outermost one and any other plate or plates thereof, thereby forming diffusely-expanded laser-beam 18.

In summary, the present invention provides a compact, portable, microprocessor-based, laser power measuring apparatus. Important features of the invention are that a photon detector, such as a photocell, is used to provide an essentially-instantaneous measurement even at low power-levels. For measuring a high-power laser-beam, which would saturate or even be destructive to the photocell if incident directly thereon, a diffusive beam expander is provided for expanding the laser-beam and thereby reducing its intensity. The diffusive beam expander is retractably inserted between the laser-beam to be measured and the photocell for making high-power measurements. Inserting or retracting the diffusive beam expander activates a switch which communicates to the microprocessor whether the diffusive beam expander is, or is not, in the path of the laser-beam to be measured. Power is computed accordingly by the microprocessor from a signal supplied thereto by the photocell.

The present invention is described and depicted herein in terms a preferred and other embodiments. The apparatus however is not limited to the embodiments described and depicted. Rather, the present invention is limited by the claims appended hereto.

What is claimed is:

1. A compact hand-held power meter, comprising:
    an elongated housing;
    a photon detector mounted within said housing;
    an aperture in said housing aligned with said photon detector;
    an attenuator slidably mounted within said housing and moveable between a first position and a second position such that when said attenuator is in said first position, said attenuator is aligned with said aperture and located over said photon detector and when in said second position, said attenuator is retracted away from said photon detector;
    circuitry mounted within the housing for monitoring the output of the photon detector to determine the level of light radiation reaching the photon detector wherein the determination is dependent upon the position of the attenuator; and
    a display mounted on said housing for providing a visual readout of the power determined by said circuitry.

2. The power meter of claim 1, further including means for inputting to said circuitry the wavelength of said laser radiation, said inputted wavelength being used by said circuitry to facilitate proper calibration of the power determined by said circuitry.

3. The power meter of claim 1, wherein said attenuator is a diffusely transmissive attenuator.

4. The power meter of claim 1 wherein said circuitry is further arranged to activate an audible alarm device located within said housing if said monitored photon detector output exceeds a predetermined limit value representative of a maximum safe irradiation level for said photon detector.

5. The power meter of claim 4 wherein said audible alarm device is a loudspeaker located within said housing.

6. The power meter of claim 4 wherein said circuitry is further arranged such that once said audible alarm is activated, said activation is maintained until the laser radiation is no longer incident on said photon detector.

7. The power meter of claim 1, wherein said circuitry is further arranged to automatically switch between first and second power measurement ranges dependent on the output of said photon detector, said second range higher than said first range and said range of measurement being indicated in said display.

8. A compact hand-held power meter, comprising:
    a housing;
    a photon detector mounted within said housing;
    a first aperture in said housing aligned with said photon detector;
    an attenuator slidably mounted within said housing and moveable between a first position and a second position such that when said attenuator is in said first position, said attenuator is aligned with said first aperture and located over said photon detector and when in the second position, said attenuator is retracted away from said photon detector;
    means for providing a separate visual indication to the user as to the position of the attenuator;
    circuitry mounted within the housing for monitoring the output of the photon detector to determine the level of light radiation reaching the photon detector wherein the determination is dependent upon the position of the attenuator; and
    a display mounted on said housing for providing a visual readout of the power determined by said circuitry.

9. The power meter of claim 8 wherein the means for providing a separate indication of the position of the attenuator includes a marker element operatively coupled to said attenuator and viewable through an second aperture in the housing when the attenuator is in one of the two said positions.

10. The power meter of claim 8, wherein said attenuator is a transmissive diffuser.

11. The power meter of claim 8, further including means for inputting to said circuitry the wavelength of said laser radiation, said inputted wavelength being used by said circuitry to facilitate proper calibration of the power determined by said circuitry.

12. The power meter of claim 8, wherein said circuitry is further arranged to activate an audible alarm device located within said housing if said monitored photon detector output exceeds a predetermined limit value representative of a maximum safe irradiation level for said photon detector.

13. A compact hand-held power meter for measuring power of laser radiation having one of a plurality of wavelengths, comprising:

an elongated housing;

a photon detector mounted within said housing;

circuitry mounted within the housing for monitoring the output of the photon detector to determine the level of light radiation reaching the photon detector, said circuitry including an electronic storage device digitally storing data characteristic of the response of said photon detector to a plurality of wavelengths and intensities of said laser radiation;

first and second switches for inputting to said circuitry the wavelength of the laser radiation to be measured, said first and second switches activated by respectively first and second buttons, one button for incrementing and the other button for decrementing through the plurality of laser wavelengths for which said characteristic data is stored and wherein said circuitry is arranged to determine the power of said laser radiation, said determination being dependent upon the output of said photon detector and the characteristic data associated with the inputted wavelength; and a display mounted on said housing for providing a visual readout of the power determined by said circuitry.

14. The power meter of claim 13 wherein said wavelength is inputted to said circuitry by first and second switches, activated by respectively first and second buttons, one button for incrementing and the other button for decrementing through the plurality of laser wavelengths for which said characteristic data is stored.

15. The power meter of claim 13, wherein said circuitry is further arranged to automatically switch between first and second power measurement ranges dependent on the output of said photon detector, said second range higher than said first range and said range of measurement being indicated in said display.

16. The power meter of claim 15, wherein said circuitry includes first and second resistors and said photon detector output is in the form of a voltage signal proportional in magnitude to the intensity of said laser radiation, said voltage signal generated across said first resistor for measuring in said first range and across said first and second resistors in parallel for measuring in said second range, said range switching being provided by an arrangement wherein when said voltage signal increases above a predetermined value in said first range said circuitry connects said second resistor across said first resistor and when said voltage signal decreases below a predetermined value in said second range said circuitry disconnects said second resistor from said first resistor.

17. The power meter of claim 13, wherein said electronic storage device is an EEPROM.

18. A laser power meter, comprising:

a photon detector;

circuitry arranged to monitor output of said photon detector in response to laser radiation incident thereon, and arranged to determine the power of said laser radiation, said circuitry arranged to determine the power of said laser radiation dependent on said photon detector output, and arranged to automatically and selectively make said determination in one of first and second power measurement ranges, dependent on said photon detector output, said second range being higher than said first range;

said circuitry including first and second resistors, and said photon detector output being in the form of a voltage signal proportional in magnitude to the intensity of said laser radiation, said voltage signal generated across said first resistor for measuring in said first range and across said first and second resistors in parallel for measuring in said second range, said range switching being provided by an arrangement wherein, when said voltage signal increases above a predetermined value in said first range said circuitry connects said second resistor across said first resistor and when said voltage signal decreases below a predetermined value in said second range said circuitry disconnects said second resistor from said first resistor; and a display connected with said circuitry for providing a visual readout of the power determined as well as an indication of said power measurement range.

19. The power meter of claim 18, wherein the output of the photon detector is in the form of an analog voltage signal and wherein said circuitry includes an analog-to-digital converter for converting said analog voltage signal to a digital signal, a switch which when closed and open respectively connects said second resistor parallel with said first resistor and disconnects said second resistor from said parallel connection with said first resistor, and a microprocessor, said microprocessor-being arranged to receive said digital signal from said analog-to-digital converter and when said digital signal rises to a predetermined maximum value close said switch, and when said digital signal falls to a predetermined minimum value open said switch.

20. The power meter of claim 18, further including means-for inputting to said circuitry the wavelength of said laser radiation, said inputted wavelength being used by said circuitry to facilitate proper calibration of the power determined by said circuitry.

21. The power meter of claim 18, wherein said circuitry is further arranged to activate an audible alarm device located within said housing if said monitored photon detector output exceeds a predetermined limit value representative of a maximum safe irradiation level for said photon detector.

22. A laser power meter for measuring power of laser radiation having a wavelength, comprising:

a photon detector;

circuitry connected with said photon detector for monitoring the output of said photon detector in response to laser radiation incident thereon and selecting the maximum value of said photon detector output monitored during a sample time period, said circuitry further determining the power of said laser radiation based upon said maximum photon detector output values;

a display connected with said circuitry for providing a visual readout of the laser radiation power determined thereby;

a battery for providing electrical power to said circuitry, and said display;

a switch for initiating and terminating said sample time period; and wherein initiating said sample time period initiates connection of said battery to said circuitry and display for providing said electrical power thereto and said circuitry is arranged to automatically disconnect said battery from said circuitry at a predetermined time interval after said sample time period is terminated whereby said visual display is terminated on termination of said predetermined time interval.

23. The power meter of claim 22 wherein said circuitry further includes an electronic storage device storing data characteristic of the response of said photon detector to various wavelengths of laser radiation and wherein the determination of said power is further based on said data.

24. A compact hand-held power meter, comprising:

an elongated housing having a generally wand-shaped configuration designed to fit in a user's pocket;

a photon detector mounted within said housing;

circuitry mounted within said housing, said circuitry arranged to monitor the output of said photon detector in response to laser radiation incident thereon, and arranged to determine the power of said laser radiation, said determination being dependent upon the output of said photon detector;

a display mounted on said housing for providing a visual readout of the power determined by said circuitry an audible alarm device mounted within said housing; and wherein said circuitry is arranged to activate said audible alarm device if said monitored photon detector output exceeds a predetermined limit value representative of a maximum safe irradiation level for said photon detector.

25. The apparatus of claim 24 wherein said audible alarm device is a loudspeaker located within said housing.

26. The apparatus of claim 24 wherein said circuitry is arranged such that once said audible alarm is activated, said activation is maintained until the laser radiation is no longer incident on said photon detector.

27. The power meter of claim 24, further including means for inputting to said circuitry the wavelength of said laser radiation, said inputted wavelength being used by said circuitry to facilitate proper calibration of the power determined by said circuitry.

* * * * *